(12) United States Patent
Shih (10) Patent No.: US 9,792,291 B2
(45) Date of Patent: Oct. 17, 2017

(54) MASTER/SLAVE COMPRESSION ENGINE

(71) Applicant: Oracle International Corporation, Redwood Shores, CA (US)

(72) Inventor: Milton Shih, Westford, MA (US)

(73) Assignee: Oracle International Corporation, Redwood Shores, CA (US)

( * ) Notice: Subject to any disclaimer, the term of this patent is extended or adjusted under 35 U.S.C. 154(b) by 42 days.

(21) Appl. No.: 15/042,726

(22) Filed: Feb. 12, 2016

(65) Prior Publication Data
US 2017/0235753 A1    Aug. 17, 2017

(51) Int. Cl.
| | |
|---|---|
| *H03M 7/34* | (2006.01) |
| *G06F 17/30* | (2006.01) |
| *G06F 12/084* | (2016.01) |
| *G06F 12/128* | (2016.01) |
| *G06F 9/38* | (2006.01) |
| *G06F 1/24* | (2006.01) |

(52) U.S. Cl.
CPC .......... *G06F 17/30153* (2013.01); *G06F 1/24* (2013.01); *G06F 9/3806* (2013.01); *G06F 12/084* (2013.01); *G06F 12/128* (2013.01); *G06F 17/30109* (2013.01); *G06F 2212/314* (2013.01); *G06F 2212/69* (2013.01)

(58) Field of Classification Search
CPC ............. G06F 17/30153; G06F 12/084; G06F 12/128; G06F 1/24; G06F 17/30109; G06F 9/3806; G06F 2212/69; G06F 2212/314; H03M 7/00

USPC ...................................................... 341/50, 51
See application file for complete search history.

(56) References Cited

U.S. PATENT DOCUMENTS

| | | | |
|---|---|---|---|
| 5,636,139 A * | 6/1997 | McLaughlin | ............ H04N 7/08 |
| | | | 348/E7.024 |
| 7,496,586 B1 | 2/2009 | Bonwick et al. | |
| 8,159,374 B2 * | 4/2012 | Schneider | ........... H03M 7/3086 |
| | | | 341/51 |

OTHER PUBLICATIONS

J. Ziv et al; "A Universal Algorithim for Sequential Data Compression"; IEEE Transactions on Information Theory, vol. IT-23, No. 3, pp. 337-343; May 1977 (7 pages).

(Continued)

*Primary Examiner* — Jean B Jeanglaude
(74) *Attorney, Agent, or Firm* — Osha Liang LLP (57) ABSTRACT

A method for hardware master/slave compression of a file, including resetting a counter; loading a first data portion of the file in a first buffer; loading a second data portion of the file in a second buffer; acquiring a first search string from the second buffer; performing a plurality of parallel searches for the acquired first search string in the first buffer; processing a plurality of results from the plurality of parallel searches; outputting a literal or a length-distance entity based on the plurality of results of the plurality of parallel searches for the acquired first search string; shifting the first buffer and the second buffer by a number of characters in a row; and acquiring a second search string from the second buffer of the file. In other aspects, a system for a hardware master/slave compression engine and a computing system for master/slave compression of a file are provided.

20 Claims, 6 Drawing Sheets

(56) References Cited

OTHER PUBLICATIONS

P. Deutsch, "GZIP file format specification version 4.3", RCF 1952, May 1996, 99. 1-12; Retrieved from Internet on Feb. 9, 2016; Retrieved from Internet: URL: https://tools.ietf.org/html/rfc1952 (12 pages).
LZBJ source code lzjb.c; Retrieved from Internet on Feb. 9, 2016; Retrieved from Internet: URL: http://www.opensource.apple.com/source/zfs/zfs-59/zfs_kext/zfs/lzjb.c (3 pages).

* cited by examiner

Example for Master/Slave Compression 400

Output: (7, 4)

FIG. 4a

Output: (c)

FIG. 4b

Output: (8, 3)

MASTER/SLAVE COMPRESSION ENGINE

BACKGROUND

Files are stored by operating systems as compressed files or as uncompressed files. A compressed file characteristically requires less storage space than an uncompressed file. Compression of files is typically done with a compression algorithm, such as a GNU (Gnu Not Unix) ZIP (GZIP) compression algorithm, a Lempel Ziv Jeff Bonwick (LZJB) compression algorithm, or a Lempel Ziv compression algorithm published in 1977 (LZ77). These compression/decompression algorithms are also referred to as simply GZIP, LZJB, or LZ77 compression/decompression algorithms or as GZIP, LZJB, or LZ77 compression/decompression types. Dependent on the operating system used, the user may be able to choose whether to use a compression algorithm, and if so, which compression algorithm is to be used. Further, the user may be able to choose the compression algorithm on a per file type basis. Compression/decompression of files can be done in software or in hardware. In the former case, the compression/decompression is also referred to as software-assisted compression/decompression or simply as software compression/decompression.

Software compression/decompression requires a relatively long amount of time to complete and utilizes additional computing resources of the processor. In contrast, hardware compression/decompression is provided, for example, on the same die as the processor or as a separate add-on card for a computing system. In both cases, the physical devices to perform hardware compression/decompression are also referred to as hardware compression/decompression engines or as compression/decompression hardware accelerators. Hardware compression/decompression, when compared to software compression/decompression, generally requires a smaller amount of time to complete and requires less processor resources but at an additional cost. For example, the processor die area on a silicon wafer is at a premium and adding one or more hardware compression/decompression accelerators to the processor die requires additional die area. Similarly, the add-on card with one or more hardware compression/decompression accelerators invokes an additional cost to the computing system. In that respect, it may be beneficial to explore how hardware compression performance can be increased to speed up file compression, while keeping a cost-adder to a minimum.

SUMMARY

In general, in one aspect, one or more embodiments disclosed herein relate to a method for hardware master/slave compression of a file, including resetting a counter; loading a first data portion of the file in a first buffer; loading a second data portion of the file in a second buffer; acquiring a first search string from the second buffer; performing a plurality of parallel searches for the acquired first search string in the first buffer; processing a plurality of results from the plurality of parallel searches; outputting a literal or a length-distance entity based on the plurality of results of the plurality of parallel searches for the acquired first search string; shifting the first buffer and the second buffer by a number of characters in a row equal to the length of a longest matching string of characters of the acquired first search string; acquiring a second search string from the second buffer of the file; and compressing the file by replacing one selected from the group consisting of a portion of or all of the second data portion of the file with the literal or length-distance entity.

In another aspect, one or more embodiments disclosed herein relate to a system for a hardware master/slave compression engine, including a first buffer, configured to load a first data portion of a file; a second buffer, configured to load a second data portion of the file; a plurality of slave search units (SSUs), configured to acquire a first search string from the second buffer and to perform a plurality of parallel searches for the acquired first search string in the first buffer; and a master search unit (MSU), operatively connected to the plurality of SSUs and configured to receive and to process a plurality of results from the plurality of parallel searches performed by the SSUs, wherein the hardware master/slave compression engine is further configured to output a literal or a length-distance entity based on the plurality of results, to shift the first buffer and the second buffer by a number of characters in a row equal to the length of a longest matching string of characters of the acquired first search string, to acquire a second search string from the second buffer of the file, and to compress the file by replacing one selected from the group consisting of a portion of or all of the second data portion of the file with the literal or length-distance entity.

In yet another aspect, one or more embodiments disclosed herein relate to a computing system for master/slave compression of a file, including a processor; a hardware master/slave compression engine, wherein the hardware master/slave compression engine resides on the same die as the processor; a memory; a storage device; and software instructions stored in the memory for enabling the computer system under control of the processor, to: reset a counter; load a first data portion of the file in a first buffer; load a second data portion of the file in a second buffer; acquire a first search string from the second buffer; perform a plurality of parallel searches for the acquired first search string in the first buffer; process the plurality of results from the plurality of parallel searches; output a literal or a length-distance entity based on the plurality of results of the plurality of parallel searches for the acquired first search string; shift the first buffer and the second buffer by a number of characters in a row equal to the length of a longest matching string of characters of the acquired first search string; acquire a second search string from the second buffer of the file; and compress the file by replacing one selected from the group consisting of a portion of or all of the second data portion of the file with the literal or length-distance entity.

Other aspects of the disclosure will be apparent from the following description and the appended claims.

DETAILED DESCRIPTION

Specific embodiments will now be described with reference to the accompanying figures. In the following detailed description, numerous specific details are set forth in order to provide a more thorough understanding of the disclosure. However, it will be apparent to one of ordinary skill in the art that embodiments may be practiced without these specific details. In other instances, well-known features have not been described in detail to avoid unnecessarily complicating the description.

Throughout the disclosure, certain specific terms will be used to describe elements or functionality of one or more embodiments. However, other terms may be likewise used to describe the same elements or functionality of one or more embodiments. For example, the terms "master/slave hardware compression engine" is also referred to as just "hardware compression engine" or as "master/slave compression engine." In addition, "hardware compression engine" and "hardware decompression engine" are also referred to as "hardware compression accelerator" and "hardware decompression accelerator" or as "compression circuit" and "decompression circuit." Similarly, the term compression/decompression "algorithm" is also referred to as compression/decompression "type" or compression/decompression "format." Further, the term "processor" is also referred to as "Central Processing Unit (CPU)" or "Graphics Processing Unit (GPU)" or "CPU/GPU" or "Computing Unit" or System-on-a-Chip (SoC). In addition, the term "compressed file" and "decompressed file" are also referred to as "compressed data stream" or "decompressed data stream."

Further, the term single "die" is also referred to as a single "chip." In addition, "a character or a combination of characters" being searched for is also referred to as a "search string," where the term "string" is defined according to the field of computer science as a sequence of one or more characters, e.g., letters, numbers, special characters, etc. However, the claimed invention is not limited to searching for a sequence of one or more characters. One of ordinary skill in the art would appreciate that a string may also refer to a sequence of one or more bits without departing from the scope of the invention.

In general, embodiments of the present disclosure relate to performance enhancements of a hardware file compression engine. Such performance enhancements may be achieved by parallelizing suitable portions of the file compression algorithm. Specifically, during the file compression with, for example, GZIP, LZJB, or LZ77 compression algorithms, a history buffer is repeatedly searched for a character or a combination of multiple characters appearing in a search pattern buffer. Once the search for the character or the combination of multiple characters is finished, the history buffer and the search pattern buffer are shifted by a predetermined amount in a direction toward the end of the file. Then, the search in the shifted history buffer for a character or a combination of multiple characters appearing in the shifted search pattern buffer recursively continues until the end of the file is reached. As the search in the history buffer is repeated many times over, a performance enhancement is achieved by increasing the speed of the history buffer search function.

Accordingly, the present disclosure relates to an efficient process for compressing a file by searching for and finding the longest matching string of bytes in a history buffer that matches a given sequences of characters. To this end, the history buffer is optimally divided into a plurality of subsections of data portions of the file. Further, a plurality of hardware-assisted parallel searches is performed in the divided subsections of the history buffer, for the character or the combination of multiple characters, i.e., the search string, appearing in the search pattern buffer.

Further, embodiments of the present disclosure relate to a hardware file compression engine, which may be implemented as part of a system-on-a-chip (SoC). SoC generally refers to an integrated circuit located on a single die (chip), e.g., a silicon die. The single die may be obtained from dicing a semiconductor wafer, e.g., a silicon wafer, which has undergone wafer processing. The integrated circuit on the single die may contain a variety of components and component groups, among them analog circuits, digital circuits, mixed signal circuits (a combination of analog and digital circuits), and others.

While in some embodiments, the hardware file compression engine may be implemented as a part of a SoC, in other embodiments; the hardware file compression engine may be implemented as a part of a system-in-a-package (SiP). A SiP generally refers to several dies (chips), which have been assembled into a single package. The several dies may be stacked onto each other or may be adjacent to each other. Yet in other embodiments, the hardware file compression engine may be implemented partly or fully in a field-programmable gate array (FPGA).

In one or more embodiments of the present disclosure, the integrated circuit may be a CPU, a GPU, or a combination thereof. The integrated circuit may be used in desktops, laptops, notebooks, workstations, gaming consoles, and in other systems. In one or more embodiments, the integrated circuit may be operatively connected with a motherboard. However, the present disclosure is not limited to these particular embodiments. Specifically, the present disclosure for the hardware file compression engine is applicable to any system, which is configured with a hardware file compression engine of at least one type.

Figure 1:
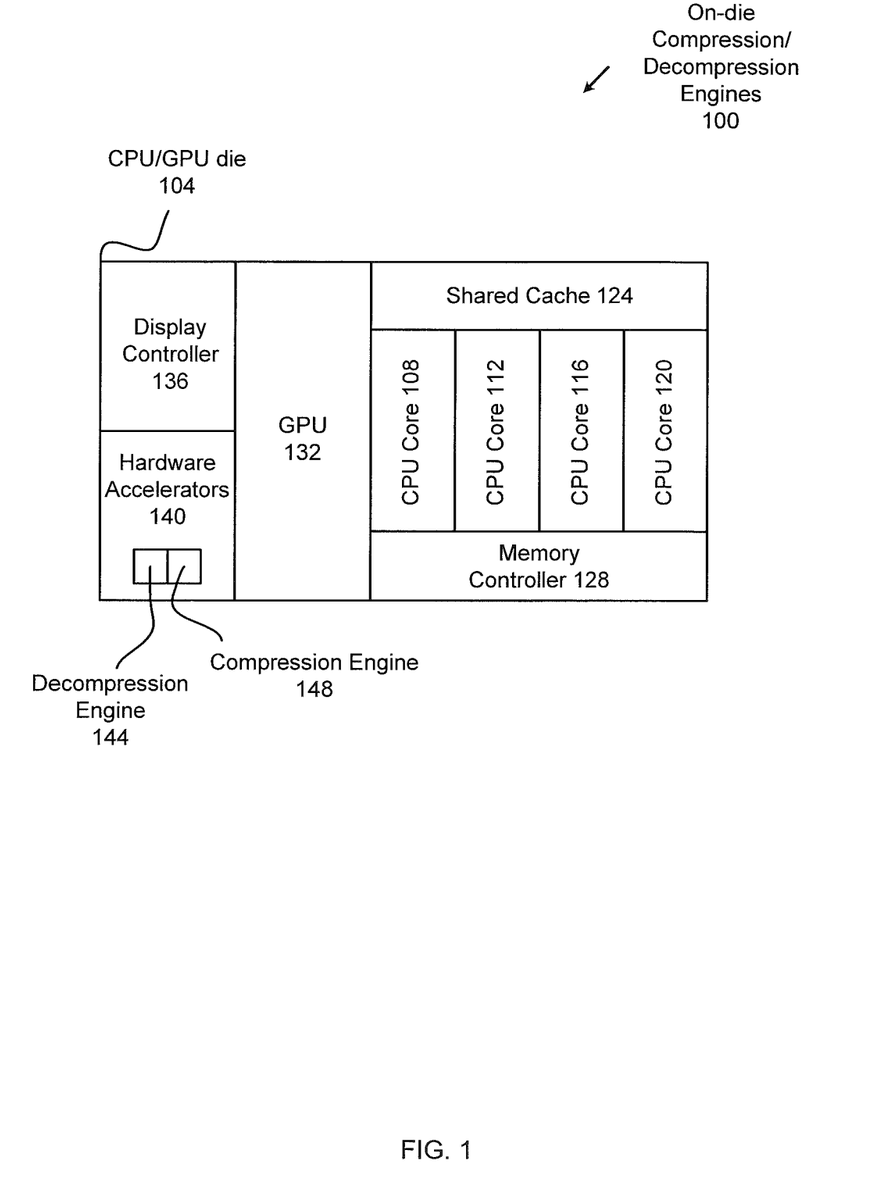
FIG. 1 shows a schematic diagram of on-die compression and decompression engines among other hardware accelerators in accordance with one or more embodiments.

FIG. 1 shows a schematic diagram 100 of on-die compression and decompression engines among other hardware accelerators in accordance with one or more embodiments. In FIG. 1, element 104 depicts a single CPU/GPU die with four CPU cores 108, 112, 116, and 120, each of which may execute program instructions. The decision regarding which particular CPU core executes instructions by a particular program or application may be controlled by the operating system. The CPU cores 108, 112, 116, and 120 are configured to have access to a shared cache 124. The shared cache 124 may contain a portion of program data that has been copied from the system memory (not shown). Therefore, the use of cache may reduce the time needed for a CPU core to access program data. The shared cache 124 may be configured to be shared among the CPU cores 108, 112, 116, and 120.

In FIG. 1, a GPU 132 is also located on the die to create and manipulate a frame buffer from which data may be sent to an output device, such as a display (not shown). Further, a memory controller 128 and a display controller 136 are shown. The memory controller 128 allows the CPU cores to access system memory to retrieve or store program data. As shown in FIG. 1, in one or more embodiments, the memory controller may be residing on the same die as the CPU/GPU die 104. In other embodiments, the memory controller 128 may be residing on a different die.

The display controller 136 in FIG. 1 may receive frame buffer data from the GPU and is configured to output the data into VGA (Video Graphics Array), HDMI (High-Definition Multimedia Interface), DVI (Digital Visual Interface), or DP (Display Port) interfaces to be displayed on a corresponding display (not shown). However, one skilled in the art would appreciate that the display controller 136 may output data to other display interfaces.

The CPU/GPU die 104 in FIG. 1 may also contain hardware accelerators 140, which support various video or audio encoders/decoders (codecs). A compression engine 148 and a decompression engine 144 are located near the hardware accelerators 140. In one or more embodiments, the compression engine 148 in FIG. 1 is a hardware file compression engine which, as described above, advantageously divides the history buffer in a plurality of subsections of data portions of the file and performs a plurality of hardware-assisted parallel searches in the subsections of the history buffer, for the character or the combination of multiple characters appearing in the search pattern buffer.

In one or more embodiments, the compression engine 148 and the decompression engine 144 may be lossless LZJB, GZIP, or LZ77 compression/decompression engines. However, in other embodiments, the compression engine 148 and the decompression engine 144 may make use of other compression and decompression algorithms, which are not limited to lossless compression and decompression algorithms.

One skilled in the art would appreciate that compression algorithms vary among each other and consequently other embodiments of the present disclosure may accordingly utilize a hardware file compression engine, which advantageously searches for the character or the combination of multiple characters, i.e., a search string, appearing in other places than the search pattern buffer. For example, the search string may be provided in another buffer, which is separate from the plurality of subsections of data portions of the file. In one or more embodiments, a series of search strings may be provided in the separate buffer and the plurality of subsections of data portions of the file may be searched for the series of search strings in a combined buffer, that is not divided into a history buffer and a search buffer. Consequently, the choice regarding on which data portions of a file a plurality of hardware-assisted parallel searches is being performed, and for which character(s) or string(s) is being searched in the hardware-assisted parallel searches, is determined by the specifics of the compression algorithm.

Further, one skilled in the art would appreciate that the compression engine 148 and the decompression engine 144 may also be located at different locations on the CPU/GPU die 104 to opportunistically benefit from proximity to relevant signals or as a result of "floor planning" to minimize the required area of the CPU/GPU die 104. Further, one of ordinary skill in the art would appreciate and understand that the number of CPU cores or the size or capability of the GPU 132 may be changed in FIG. 1. Accordingly, arrangements other than the one shown in FIG. 1 may be contemplated without departing from the scope of the invention. In addition, elements not shown in FIG. 1 may be added to the CPU/GPU die 104 without departing from the scope of the disclosure.

Figure 2:
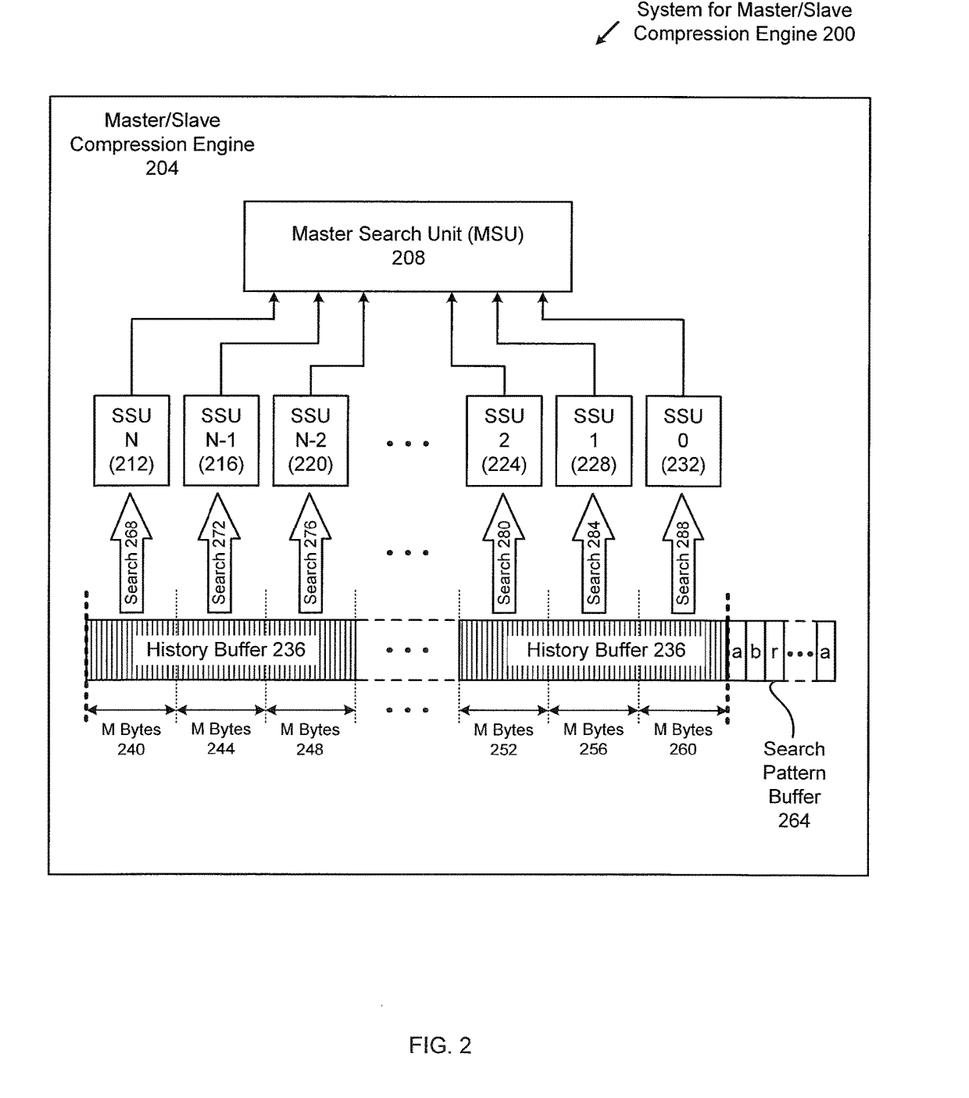
FIG. 2 shows a system for a master/slave compression engine in accordance with one or more embodiments.

Referring now to FIG. 2, FIG. 2 illustrates a system 200 for a master/slave compression engine 204. In the embodiment in FIG. 2, the master/slave compression engine 204 may be used for file compression with an LZJB compression algorithm. However, one skilled in the art will appreciate that the master/slave compression engine 204 may also be used with other compression algorithms. The master/slave compression engine 204 may include a history buffer (a first buffer) 236 and a search pattern buffer (a second buffer) 264, disposed adjacent to each other. In one or more embodiments, the history buffer 236 and the search pattern buffer 264 may be adjacent to each other, with respect to their logical addressing. The history buffer 236 and the search pattern buffer 264 may contain data representing a file to be compressed. Specifically, the data representing a file to be compressed may be loaded into the history buffer 236 and the search pattern buffer 264 from a working memory, e.g., a random access memory (RAM).

In the embodiment of FIG. 2, the convention is that the beginning of the file to be compressed is on the left-hand side, while the end of the file to be compressed is on the right-hand side. Accordingly, the history buffer 236 is located on the left-hand side and is on a side of the search pattern buffer 264 in a direction toward a beginning of the file. Analogously, the search pattern buffer 264 is on a side of the history buffer 236 in a direction toward an end of the file. However, one skilled in the art will appreciate that another convention with respect to the beginning or end of the file may be used.

The history buffer 236 may include a first data portion of the file and may have a predetermined width. The predetermined width of the history buffer 236 may also be referred to as history buffer depth. Specifically, in the embodiment in FIG. 2, the history buffer 236 may include a plurality of subsections 240, 244, 248, 252, 256, and 260 of the first data portion of the file. The history buffer 236 may contain literals, e.g., letters of the alphabet. In the embodiment in FIG. 2, the literals may be represented with a numerical code, e.g., with the American Standard Code for Information Interchange (ASCII). In other embodiments, the literals may be represented with a different numerical code. In yet other embodiments, the history buffer 236 may contain data that is not representative of literals, but instead of other symbols or data structures.

The search pattern buffer 264 may include a second data portion of the file and may have another predetermined width. The predetermined width of the search pattern buffer 264 may also be referred to as search pattern buffer depth. Specifically, the second data portion of the file may be the leading edge of the file data to be compressed by the master/slave compression engine 204. Analogously to the history buffer 236, the search pattern buffer 264 may contain literals, where the literals in the embodiment in FIG. 2 may be represented by the ASCII code. In other embodiments, the literals may be represented with a different numerical code. In yet other embodiments, the search pattern buffer 264 may contain data that are not representative of literals, but instead of other symbols or data structures.

As described above, the data representing a file to be compressed may be loaded into the history buffer 236 and the search pattern buffer 264 from a working memory, e.g., a random access memory (RAM). Specifically, after loading of the data, the beginning of the file to be compressed is disposed in the history buffer 236, while the remainder of the file to be compressed is disposed in the search pattern buffer 264. In one or more embodiments, the depth of the search pattern buffer 264 may be smaller than the remainder of the file to be compressed. In these embodiments, only a portion of the remainder of the file is initially loaded from the RAM into the search pattern buffer 264.

One of ordinary skill in the art will appreciate that in one or more embodiments, the history buffer 236 and the search pattern buffer 264 may physically be the same buffer and pointers, e.g., variables, designate the beginning and end of the history buffer 236 and the search pattern buffer 264 within the same buffer. In other embodiments, the history buffer 236 and the search pattern buffer 264 may be physically separate buffers.

In FIG. 2, the plurality of subsections 240, 244, 248, 252, 256, and 260 of the first data portion of the file are all of a same predetermined width (depth) of "M" bytes. However, one skilled in the art will appreciate that the widths (depths) of the plurality of subsections 240, 244, 248, 252, 256, and 260 of the first data portion of the file may also be different for each individual subsection in other embodiments. Further, while the embodiment in FIG. 2 is shown with the plurality of subsections 240, 244, 248, 252, 256, and 260 of the first data portion of the file adjoining each other, other embodiments may include subsections 240, 244, 248, 252, 256, and 260 which may be of a predetermined width (depth) to overlap each other. In one or more embodiments, an overlapping of subsections 240, 244, 248, 252, 256, and 260 of the first data portion of the file may allow, when the history buffer is searched for a combination of multiple characters appearing in the search pattern buffer, to identify a combination of multiple characters even extending beyond the boundaries of each individual subsection 240, 244, 248, 252, 256, and 260. While the embodiment in FIG. 2 has been described with reference to subsections 240, 244, 248, 252, 256, and 260, one skilled in the art will appreciate that other embodiments may include a number of subsections that is smaller or greater than the number of subsections shown in the embodiment in FIG. 2, without departing from the scope of the invention.

As described above, in one or more embodiments, the history buffer in FIG. 2 is searched for a character or a combination of characters (a search string) appearing in the search pattern buffer. Specifically a plurality of slave search units (SSUs) 212, 216, 220, 224, 228, and 232 may acquire a search string from the search pattern buffer 264 and may perform a plurality of parallel searches 268, 272, 276, 280, 284, and 288, for the acquired search string in the history buffer 236. In other words, the plurality of SSUs 212, 216, 220, 224, 228, and 232 may search a subsection of the first data portion of the file.

In FIG. 2, a master search unit (MSU) 208 is connected to the plurality of SSUs 212, 216, 220, 224, 228, and 232 and receives the results from the plurality of parallel searches 268, 272, 276, 280, 284, and 288. The MSU 208 processes the results from the plurality of parallel searches 268, 272, 276, 280, 284, and 288 and the hardware master/slave compression engine 204 may then output literal entities and length-distance entities as a separate compressed file data stream, after the literal entities and length-distance entities have gone further processing by the master/slave compression engine 204. Subsequently, the hardware master/slave compression engine 204 may shift the history buffer and the search pattern buffer in the direction toward the end of the file, and may acquire a next search string from the search pattern buffer of the file. In one or more embodiments, the shift amount may be equal to the number of matching literals appearing in the search pattern buffer 264 that were found in a row in the history buffer 236 during the search.

While the embodiment in FIG. 2 has been described with reference to the plurality of SSUs 212, 216, 220, 224, 228 and with reference to the plurality of parallel searches 268, 272, 276, 280, 284, and 288, one skilled in the art will appreciate that other embodiments may include a number of SSUs and/or parallel searches that is smaller or greater than the number of SSUs and parallel searches shown in the embodiment in FIG. 2.

Embodiments of the system 200 for the master/slave compression engine in FIG. 2 may be implemented on the processor die. Alternatively, the system 200 for the master/slave compression engine may be implemented on another die which is separate from the processor die. In other embodiments, the system 200 for the master/slave compression engine in FIG. 2 may be realized as a combination of hardware and software. Further, one skilled in the art will appreciate that the system 200 for the master/slave compression engine may be a system for compression according to an LZJB, a GZIP, or an LZ77 algorithm, or according to other lossless or lossy algorithms suitable for parallel searches.

As explained above, the history buffer (a first buffer) and the search pattern buffer (a second buffer) are disposed adjacent to one another with respect to their logical addressing in one or more embodiments of the present disclosure. In addition, in one or more embodiments of the present disclosure, the search pattern buffer with respect to addressing is on the side of the history buffer which is in the direction toward the end of the file. Further, during the file compression using a predetermined compression algorithm, the history buffer is repeatedly searched for a character or a combination of multiple characters appearing in a search pattern buffer. Once the search for the character or the combination of multiple characters is finished, the history buffer and the search pattern buffer are shifted by a predetermined amount in a direction toward the end of the file. Then, the search in the shifted history buffer for a character or a combination of multiple characters appearing in the shifted search pattern buffer recursively continues until the end of the file is reached.

Figure 3A:
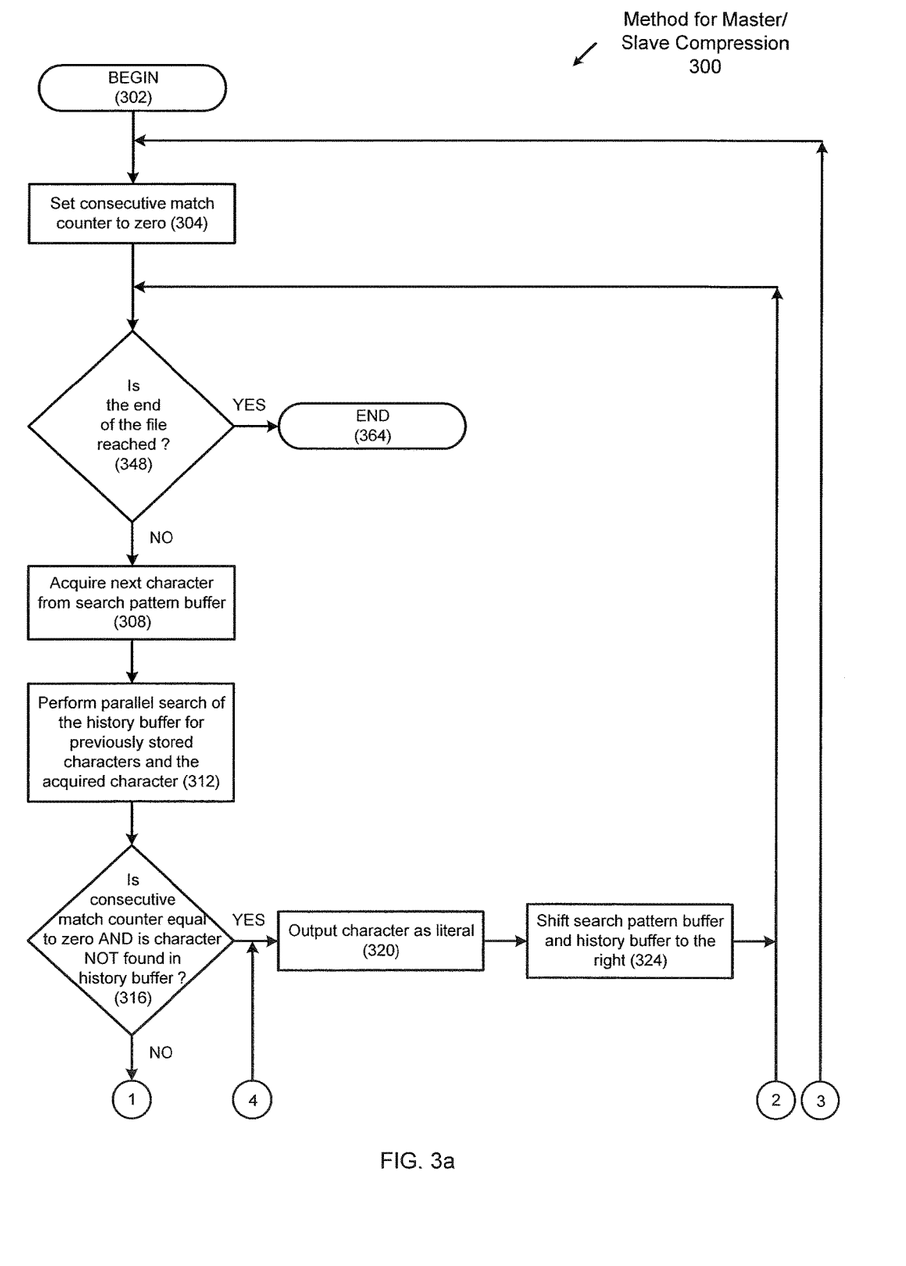
FIGS. 3a and 3b show a method flowchart for master/slave compression in accordance with one or more embodiments.
Figure 3B:
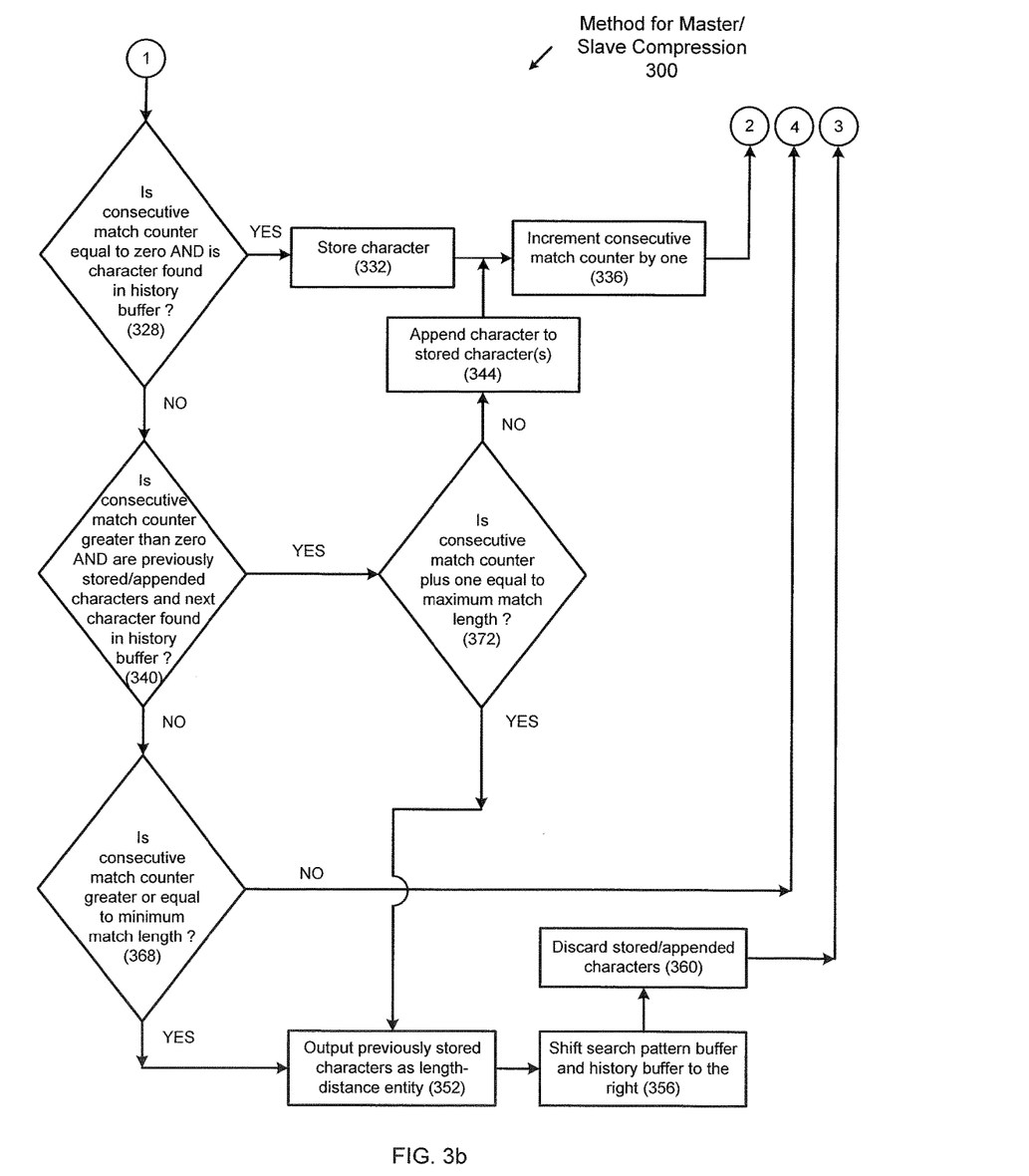

Accordingly, FIGS. 3a and 3b illustrate flowcharts for a method for hardware master/slave compression 300 of a file in accordance with one or more embodiments. Specifically, the method for hardware master/slave compression 300 of a file may be a recursive method beginning at step 302. In step 304, a consecutive match counter is set or reset to zero. The consecutive match counter may be a counter to track how many characters in a row appearing in the search pattern buffer have been found in the history buffer. The method then continues at step 348, in which a determination is made as to whether the end of the file has been reached, e.g., when the history buffer and the search pattern buffer can no longer be shifted without exceeding the end of the file. If the result of the check at step 348 is "Yes," then the method ends at step 364. However, if the result of the evaluation at step 348 is "No," then the method proceeds to step 308, at which point, when the method arrives at this step for the first time, a first character is acquired from the search pattern buffer. All other subsequent times when the method arrives at step 308, a next character is acquired from the search pattern buffer. In step 312, when the method arrives at this step for the first time, a parallel search of the history buffer is performed for the acquired character from the search pattern buffer. All other subsequent times when the method arrives at step 312, the method performs a parallel search of the history buffer for the acquired character from the search pattern buffer and for any previously stored character(s). Specifically, the conditions relating to when character(s) are getting stored will become clearer from the descriptions of steps 332 and 344 discussed below.

Next, in step 316, a check is performed to determine whether the consecutive match counter is zero and whether the character is not found in the history buffer (a check for a first condition). This case is typically reflective of a file compression that is still at the beginning of the file compression algorithm. If the result of the check at step 316 is "Yes," then the method continues to step 320, where the matching character is output as a literal to the compressed file data stream. Subsequently at step 324, both the search pattern buffer and the history buffer are shifted to the right, specifically, in the direction toward the end of the file. The process then returns to step 348, in which another determination is made as to whether the end of the file has been reached. If the result of the check at step 316 is "No," then the method proceeds to step 328.

Continuing with FIG. 3*a*, at step 328, a check is performed to determine whether the consecutive match counter is zero and whether the character is found in the history buffer (a check of a second condition). This case may be reflective of a file compression which has progressed further from the beginning of the file compression algorithm. If the result of the check at step 328 is "Yes," then the method continues to step 332, where the matching character is temporarily stored in another buffer. In one or more embodiments, the matching character is temporarily stored in another buffer in the MSU 208. In other embodiments, the matching character is temporarily stored in another buffer in the master/slave compression engine 204. However, embodiments of the invention are not limited to disposing another buffer in the MSU 208 or in the master/slave compression engine 204. Specifically, the buffer may be disposed elsewhere on the die without departing from the scope of the invention. Upon storing the matching character, the consecutive match counter is incremented, e.g., by one, in step 336. The method then loops back to step 348, in which another determination is made as to whether the end of the file has been reached. If the result of the check at step 328 is "No," then the method proceeds to step 340. In one or more embodiments, if the end of the file is reached, and there are outstanding, matched characters stored in another buffer, then these characters can either be output as a consecutive string of literals, or as a length-distance entity (assuming the current value of the counter matches or exceeds minimum length requirements). Either behavior may be implemented without departing from the scope of the invention.

At step 340, another check is performed to determine whether the consecutive match counter is greater than zero and whether the previously stored or stored and appended characters, as well as the next acquired character, are found in the history buffer (a check of a third condition). Step 340 typically occurs when file compression has significantly progressed and multiple characters in a row appearing in the search pattern buffer have already been found in the history buffer. If the result of the check at step 340 is "Yes," then the method continues to step 372, in which a determination is made whether the consecutive match counter plus one is equal to a maximum match length. If the result of the determination in step 372 is "No," then the method proceeds to step 344 where the next matching character is appended to the already stored character(s). Subsequently, the consecutive match counter is incremented, e.g., by one, in step 336 and the method loops back to step 348. If the result of the check at step 340 is "No," then the method proceeds to step 368.

At step 368, a determination is made as to whether the consecutive match counter is greater or equal to a minimum match length. In one or more embodiments, the minimum match length may be 3 characters. Alternatively, the minimum match length may be any suitable length of characters without departing from the scope of the invention. If the result of the determination at step 368 is "No," then the method continues to step 320 where the character is output as a literal to the compressed file data stream. If the result of the determination at step 368 is "Yes," then the method continues to step 352 at which the previously stored characters are output as a length-distance entity to the compressed file data stream. In addition, if the result of the determination in step 372 is "Yes," then the method also proceeds to step 352.

In this context, a length-distance entity is a sequence of data, in which the "length" refers to the length of consecutive characters that appeared in the search pattern buffer and which were found in the history buffer. Further, in this context, "distance" refers to the number of characters between the head of the history buffer (i.e., the boundary closest to the end of the file) and the start of where the consecutive characters can actually be found in the history buffer. In one or more embodiments, the character(s) are encoded in the ASCII format. Accordingly, as the ASCII encoding is done in 8 bits (1 byte) per character, the distance and length referred to above is measured in byte(s). Other embodiments may utilize other character(s) encoding without departing from the scope of the invention. The length-distance entity is subsequently output as part of the separate compressed data stream. Subsequent to step 352, the method then continues to step 356, in which the search pattern buffer and the history buffer are shifted to the right, specifically, in the direction toward the end of the file. Then, the method discards the stored/appended characters at step 360. Subsequently, the method loops back to step 304 in which the consecutive loop counter is set or reset to zero.

The present disclosure is not limited to the embodiment described with respect to the method flowchart in FIGS. 3*a* and 3*b*. One of ordinary skill in the art would readily appreciate that the method for master/slave compression 300 could be realized differently without departing from the scope of the invention. For example, in the embodiment described with respect to FIG. 3*a-b*, a different but analogous recursive flow could be used to achieve the same objective. In addition, one skilled in the art will appreciate that if consecutive characters appearing in the search pattern buffer are found during the parallel search in multiple locations in the history buffer, then the find with the shortest distance from the search pattern buffer relative to the consecutive characters found in the history buffer is represented as a length-distance entity, i.e., the length-distance entity requires fewer bits for encoding and consequently results in a smaller compressed file. However, in other embodiments, alternate rules may be employed to affect the representation of multiple occurrences of consecutive characters in the history buffer.

Further, in one or more embodiments, the compressed data stream is compressed with an LZJB algorithm, and an 8-bit control byte is inserted in front of every 8 entities, before being output to the compressed data stream. In other embodiments, the compressed data stream is compressed with a GZIP algorithm, and literals and length-distance entities are Huffman encoded before being output to the compressed data stream. However, in yet other embodiments, the compressed data stream is compressed with another compression algorithm without departing from the scope of the disclosure.

As described above, in other embodiments, an overlapping of subsections of the first data portion of the file may allow, when the history buffer is searched for a combination of multiple characters appearing in the search pattern buffer, to identify a combination of multiple characters even extending beyond the boundaries of each individual subsection. For example, in a case where each slave unit is assigned a subsection of N history buffer characters to search, and the maximum match length is M characters, then a slave may search up to M−1 characters into the subsection of the slave unit that is adjacent (i.e., closer to the end of the file) to it. Thus, in the event that a sequence of M characters in the history buffer matches M consecutive characters in the search pattern buffer, then it will be found by the slave unit whose subsection contains the starting character of the sequence of M characters, even if the starting character is the last character in the subsection, in which case the remaining M−1 characters are located in the adjacent subsection. In one or more embodiments, M<N, therefore a matching sequence of characters beginning in a slave unit's subsection can extend into, at most, the subsection of one other slave unit.

Figure 4A:
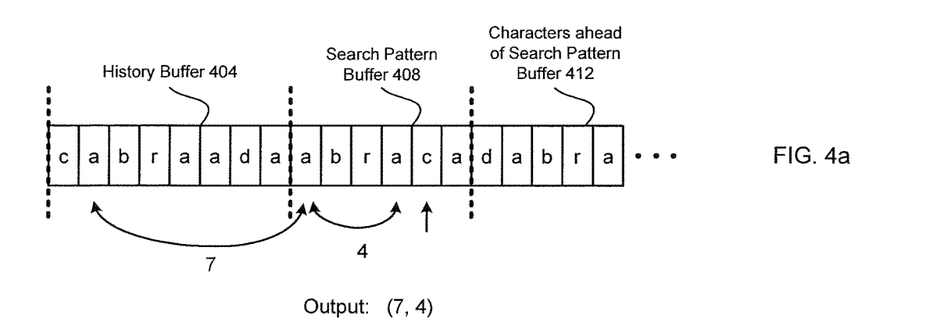
FIGS. 4a, 4b, and 4c illustrate an example for using a master/slave compression engine in accordance with one or more embodiments.
Figure 4B:
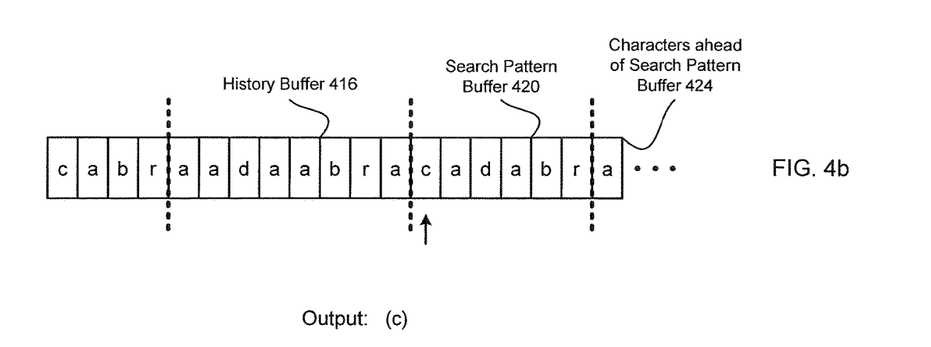
Figure 4C:
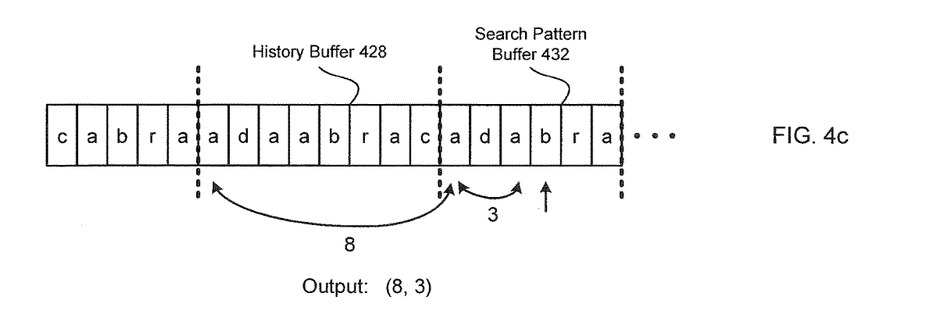

FIGS. 4a, 4b, and 4c illustrate an example 400 for master/slave file compression. The example starts in FIG. 4a, which shows history buffer 404 and search pattern buffer 408. In addition, several characters 412 ahead of the search pattern buffer are shown. In this particular example, the history buffer 404 is 8 characters wide and the search pattern buffer 408 has a width of 6 characters. The master/slave file compression in FIG. 4a attempts to find the first character "a" of the search pattern buffer 408 in the history buffer 404. Indeed, "a" is found as the second character from the left in the history buffer. The master/slave file compression in FIG. 4a continues to determine if also "ab" appearing in the search pattern buffer 408 can be found in the history buffer 404. Indeed, "ab" is also found in the history buffer 408 as second and third characters from the left. The master/slave file compression continues until the longest sequence of consecutive characters appearing in the search pattern buffer 408 is found in the history buffer 404. This longest sequence of consecutive characters is represented by "abra" as shown in FIG. 4a. The master/slave file compression then outputs the length-distance entity (7, 4), in which "7" indicates the distance between the beginning of the sequence of data "abra" in the search pattern buffer 408, and the beginning of the consecutive characters "abra" in the history buffer 404. Further, "4" indicates the length of consecutive characters of which there are four in "abra."

Next, in FIG. 4b, the history buffer 416 and the search pattern buffer 420 are shifted to the right toward the end of the file by a predetermined number of characters. In this particular example, the predetermined number of characters is four, because "abra" contains four characters. Accordingly, in FIG. 4b, the start and end of the history buffer 416 and the start and end of the search pattern buffer 420 are all shifted to the right toward the end of the file by four characters. The master/slave file compression again attempts to find the first character "c" of the search pattern buffer 420 in the history buffer 416. This time, the character "c" is not found in the history buffer 416. Therefore, the master/slave file compression outputs the literal "c," which indicates that the character "c" was not found in the history buffer 416.

Then, in FIG. 4c, the history buffer 428 and the search pattern buffer 432 are shifted to the right toward the end of the file by one character, because "c" represents a single character. Accordingly, in FIG. 4c, the start and end of the history buffer 428 and the start and end of the search pattern buffer 432 are all shifted to the right toward the end of the file by one character. Similar to FIG. 4a, the master/slave file compression again attempts to find the longest consecutive sequence of characters in the history buffer 428 which are appearing in the search pattern buffer 432. In this case, the longest consecutive sequence is "ada."

The master/slave file compression then outputs the length-distance entity (8, 3), in which "8" indicates the distance between the beginning of the sequence of data "ada" in the search pattern buffer 432 and the beginning of the consecutive characters "ada" in the history buffer 428. Further, "3" indicates the length of consecutive characters of which there are three in "ada." The master/slave file compression then continues until the end of the file has been reached.

In one or more embodiments, the system for a hardware master/slave compression engine includes hardware (e.g., circuitry), software, firmware, or any combination thereof, that includes functionality to perform at least some functions described herein in accordance with one or more embodiments of the present disclosure. In one or more embodiments, the system for a master/slave compression engine of the present disclosure is, at least in part, a software application, or a portion thereof, written in any programming language that includes instructions stored on a non-transitory computer readable medium which, when executed by one or more processors in a computing device, enable the computing device to perform the functions described in accordance with one or more embodiments of the disclosure. In one or more embodiments, the system for a hardware master/slave compression engine may be implemented using buffers, e.g., memory, etc. In other embodiments, the system for the hardware master/slave compression engine may be implemented using registers, e.g., flip-flops, etc.

Further, one or more embodiments of the present disclosure may be implemented for the compression of files into the file system (100) in FIG. 1 of U.S. Pat. No. 7,496,586, which is incorporated herein by reference in its entirety. Specifically, one or more embodiments of the invention may be implemented to store compressed files into the storage pool of the file system described in U.S. Pat. No. 7,496,586. In addition, details regarding the various compression/decompression algorithms are provided, for example, in: Jacob Ziv; Abraham Lempel; "A Universal Algorithm for Sequential Data Compression"; IEEE Transactions on Information Theory 23 (3); pp. 337-343; May 1977; P. Deutsch, "GZIP file format specification version 4.3", RFC 1952, May 1996, pp. 1-12, and the LZJB source code lzjb.c (available as part of the Open Solaris initiative), which are incorporated herein by reference in their entirety.

Figure 5:
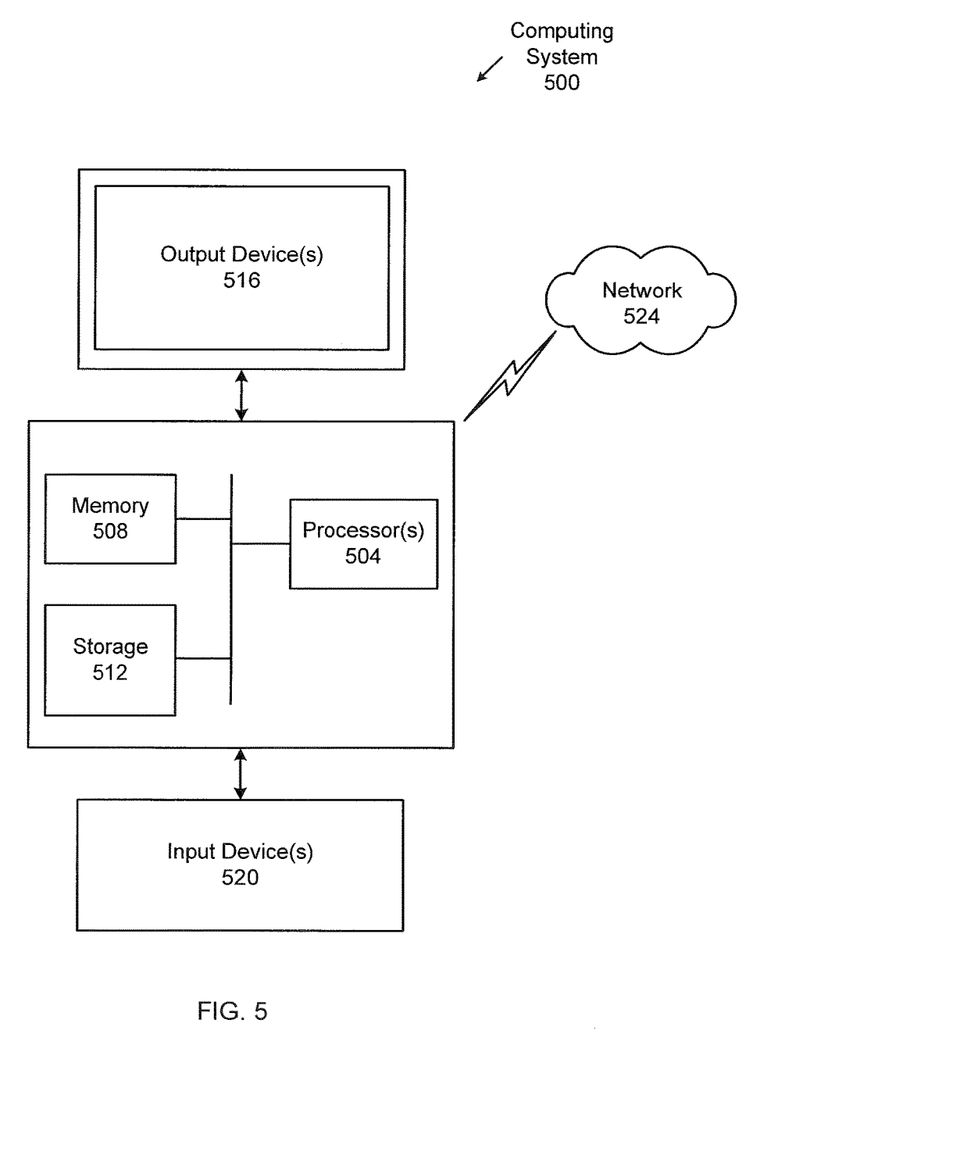
FIG. 5 shows a computing system in accordance with one or more embodiments.

One or more embodiments of the present disclosure may be implemented on virtually any type of computing system, regardless of the platform being used. In one or more embodiments, the computing system may be an embedded microcontroller with one or more microprocessors. For example, as shown in FIG. 5, the computing system (500) may include one or more processor(s) (504), associated memory (508) (e.g., random access memory (RAM), cache memory, flash memory, etc.), one or more storage device(s) (512) (e.g., a hard disk, an optical drive such as a compact disc (CD) drive or digital versatile disc (DVD) drive, a flash memory stick, a solid state drive (SSD), etc.), and numerous other elements and functionalities. The processor(s) (504) may be an integrated circuit for processing instructions. For example, the processor(s) may be one or more cores, or micro-cores of a processor. The computing system (500) may also include one or more input device(s) (520), such as a touchscreen, keyboard, mouse, microphone, touchpad, electronic pen, or any other type of input device.

Further, the computing system (500) may include one or more output device(s) (516), such as a screen (e.g., a liquid crystal display (LCD), a plasma display, touchscreen, projector, or other display device), a printer, external storage, or any other output device. One or more of the output device(s)

may be the same or different from the input device(s). The computing system (500) may be connected to a network (524) (e.g., a local area network (LAN), a wide area network (WAN) such as the Internet, mobile network, or any other type of network) via a network interface connection (not shown). The input and output device(s) may be locally or remotely (e.g., via the network (524)) connected to the processor(s) (504), memory (508), and storage device(s) (512). Many different types of embedded and non-embedded computing systems exist, and the aforementioned input and output device(s) may take other forms. In one or more embodiments, the computing system may be a headless system, e.g. no input devices 520 and/or no output devices 516 may be utilized.

Software instructions in the form of computer readable program code to perform embodiments may be stored, in whole or in part, temporarily or permanently, on the non-transitory computer readable medium. Such non-transitory computer readable medium maybe an erasable programmable read only memory (EPROM), a flash memory, an internal or external storage device, a DVD, a CD, or any other computer or embedded microcontroller readable storage medium. Specifically, the software instructions may correspond to computer readable program code or embedded microcontroller readable program code that when executed by a processor(s), is configured to perform embodiments of the disclosure. In addition, the software instructions and the associated non-transitory computer readable medium may also be referred to as firmware. In one or more embodiments, the firmware may be updated.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for hardware master/slave compression of a file, the method comprising:
    resetting a counter;
    loading a first data portion of the file in a first buffer;
    loading a second data portion of the file in a second buffer;
    acquiring a first search string from the second buffer;
    performing a plurality of parallel searches for the acquired first search string in the first buffer;
    processing a plurality of results from the plurality of parallel searches;
    outputting a literal or a length-distance entity based on the plurality of results of the plurality of parallel searches for the acquired first search string;
    shifting the first buffer and the second buffer by a number of characters in a row equal to the length of a longest matching string of characters of the acquired first search string;
    acquiring a second search string from the second buffer of the file; and
    compressing the file by replacing one selected from the group consisting of a portion of or all of the second data portion of the file with the literal or length-distance entity.

2. The method for master/slave compression of a file according to claim 1, wherein when the counter is equal to zero and when the acquired first search string is not found in the first buffer:
    outputting the first search string as the literal.

3. The method for master/slave compression of a file according to claim 1, wherein when the counter is equal to zero and when the acquired first search string is found in the first buffer:
    storing the first search string in a third buffer; and
    incrementing the counter.

4. The method for master/slave compression of a file according to claim 3, wherein when the counter is greater than zero and when the acquired second search string is found in the first buffer:
    appending the second search string to the stored first search string;
    incrementing the counter; and
    continuing the plurality of parallel searches in the first buffer with the second search string appended to the first search string.

5. The method for master/slave compression of a file according to claim 3, wherein when the counter is greater than zero, the acquired second search string is not found in the first buffer, and the shifting of the first and second buffers does not reach an end of the file:
    outputting the first search string as the length-distance entity;
    discarding the stored first search string; and
    resetting the counter.

6. The method for master/slave compression of a file according to claim 1, wherein the counter is a consecutive match counter.

7. The method for master/slave compression of a file according to claim 1, wherein the first buffer comprises a history buffer.

8. The method for master/slave compression of a file according to claim 1, wherein the second buffer comprises a search pattern buffer.

9. The method for master/slave compression of a file according to claim 1, wherein the method for master/slave compression comprises a lossless algorithm.

10. The method for master/slave compression of a file according to claim 1, wherein the first buffer and the second buffer are disposed adjacent to each other with respect to their logical addresses and the second buffer is on a side of the first buffer in a direction toward an end of the file.

11. The method for master/slave compression of a file according to claim 1, wherein the shifting of the first buffer and the second buffer comprises shifting in a direction toward an end of the file.

12. A system for a hardware master/slave compression engine, the system comprising:
    a first buffer, configured to load a first data portion of a file;
    a second buffer, configured to load a second data portion of the file;
    a plurality of slave search units (SSUs), configured to acquire a first search string from the second buffer and to perform a plurality of parallel searches for the acquired first search string in the first buffer; and
    a master search unit (MSU), operatively connected to the plurality of SSUs and configured to receive and to process a plurality of results from the plurality of parallel searches performed by the SSUs,
    wherein the hardware master/slave compression engine is further configured to output a literal or a length-distance entity based on the plurality of results, to shift the first buffer and the second buffer by a number of characters in a row equal to the length of a longest matching string of characters of the acquired first search string, to acquire a second search string from the second buffer of the file, and to compress the file by replacing one selected from the group consisting of a portion of or all of the second data portion of the file with the literal or length-distance entity.

13. The system for a hardware master/slave compression engine according to claim 12, wherein the first buffer further comprises a plurality of subsections and the first data portion of the file is loaded into the first buffer such that the first data portion of the file is divided among the plurality of subsections of the first buffer.

14. The system for a hardware master/slave compression engine according to claim 12, wherein each of the plurality of SSUs performs a search within a subsection of the first data buffer.

15. The system for a hardware master/slave compression engine according to claim 13, wherein the plurality of subsections of the first buffer are disposed adjacent to each other with respect to their logical addresses.

16. The system for a hardware master/slave compression engine according to claim 13, wherein the plurality of subsections of the first buffer at least partially overlap each other.

17. The system for a hardware master/slave compression engine according to claim 12, wherein the first buffer and the second buffer are disposed adjacent to each other with respect to their logical addresses and the second buffer is on a side of the first buffer in a direction toward an end of the file.

18. The system for master/slave compression of a file according to claim 12, wherein the first buffer comprises a history buffer.

19. The system for master/slave compression of a file according to claim 12, wherein the second buffer comprises a search pattern buffer.

20. A computing system for master/slave compression of a file, the computing system comprising:
a processor;
a hardware master/slave compression engine, wherein the hardware master/slave compression engine resides on the same die as the processor;
a memory;
a storage device; and
software instructions stored in the memory for enabling the computer system under control of the processor, to:
reset a counter;
load a first data portion of the file in a first buffer;
load a second data portion of the file in a second buffer;
acquire a first search string from the second buffer;
perform a plurality of parallel searches for the acquired first search string in the first buffer;
process the plurality of results from the plurality of parallel searches;
output a literal or a length-distance entity based on the plurality of results of the plurality of parallel searches for the acquired first search string;
shift the first buffer and the second buffer by a number of characters in a row equal to the length of a longest matching string of characters of the acquired first search string;
acquire a second search string from the second buffer of the file; and
compress the file by replacing one selected from the group consisting of a portion of or all of the second data portion of the file with the literal or length-distance entity.

* * * * *

UNITED STATES PATENT AND TRADEMARK OFFICE
CERTIFICATE OF CORRECTION

PATENT NO. : 9,792,291 B2
APPLICATION NO. : 15/042726
DATED : October 17, 2017
INVENTOR(S) : Shih Page 1 of 1

It is certified that error appears in the above-identified patent and that said Letters Patent is hereby corrected as shown below:

On the Title Page

Column 2, under Other Publications, Line 1, delete "Algorithim" and insert -- Algorithm --, therefor.

On page 2, Column 1, under Other Publications, Line 5, delete "LZBJ" and insert -- LZJB --, therefor.

In the Specification

In Column 10, Line 37, delete "FIG." and insert -- FIGS. --, therefor.

Signed and Sealed this
Fifth Day of June, 2018

Andrei Iancu
*Director of the United States Patent and Trademark Office*